United States Patent
Kim et al.

(10) Patent No.: US 10,237,003 B2
(45) Date of Patent: Mar. 19, 2019

(54) METHOD AND APPARATUS FOR ESTIMATING CHANNEL COMMUNICATION QUALITY OF WIRELESS COMMUNICATION TECHNOLOGY

(71) Applicant: Korea University Research and Business Foundation, Seoul (KR)

(72) Inventors: Hwangnam Kim, Seoul (KR); Woonghee Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 67 days.

(21) Appl. No.: 15/403,684

(22) Filed: Jan. 11, 2017

(65) Prior Publication Data

US 2017/0288792 A1    Oct. 5, 2017

(30) Foreign Application Priority Data

Apr. 5, 2016   (KR) .................. 10-2016-0041427

(51) Int. Cl.
*H04L 1/00*     (2006.01)
*H04B 17/309*   (2015.01)
*H04W 24/08*    (2009.01)

(52) U.S. Cl.
CPC .......... *H04B 17/309* (2015.01); *H04W 24/08* (2013.01)

(58) Field of Classification Search
CPC ..... H04W 24/08; H04W 72/04; H04W 24/10; H04W 88/06
See application file for complete search history.

(56) References Cited

U.S. PATENT DOCUMENTS

| | | | | |
|---|---|---|---|---|
| 2006/0292988 A1* | 12/2006 | Yuen | .................... | H04L 1/0026 455/62 |
| 2009/0163142 A1* | 6/2009 | Pi | ......................... | H04L 1/0026 455/62 |
| 2014/0056275 A1* | 2/2014 | Behnamfar | ......... | H04W 72/085 370/330 |
| 2014/0098757 A1* | 4/2014 | Khandekar | ........... | H04L 1/0003 370/329 |
| 2014/0192664 A1* | 7/2014 | Ericson | ................. | H04W 24/10 370/252 |

* cited by examiner

*Primary Examiner* — Abdelnabi O Musa
(74) *Attorney, Agent, or Firm* — Fox Rothschild LLP

(57) ABSTRACT

Provided is a channel communication quality estimating method of a wireless communication technology. A method for estimating a channel communication quality of a second wireless communication technology whose frequency band entirely or partially overlaps a frequency band of a first wireless communication technology includes: transmitting predetermined data to an external device through each of a plurality of first channels which forms a frequency band of the first wireless communication technology; generating a channel map which represents a communication quality for each of the plurality of first channels based on a data transmission result through each of the plurality of first channels; and calculating a communication quality index for each of a plurality of second channels which forms a frequency band of the second wireless communication technology, based on the channel map.

12 Claims, 10 Drawing Sheets

| SLEEP TIME (SECONDS) | 5 | 10 | 30 | 60 |
|---|---|---|---|---|
| INCREASED CURRENT AMOUNT (mA) | 11.27 | 9.40 | 5.26 | 4.10 |
| INCREASING RATE (%) | 3.0 | 2.5 | 1.4 | 1.1 |

[FIG. 1]
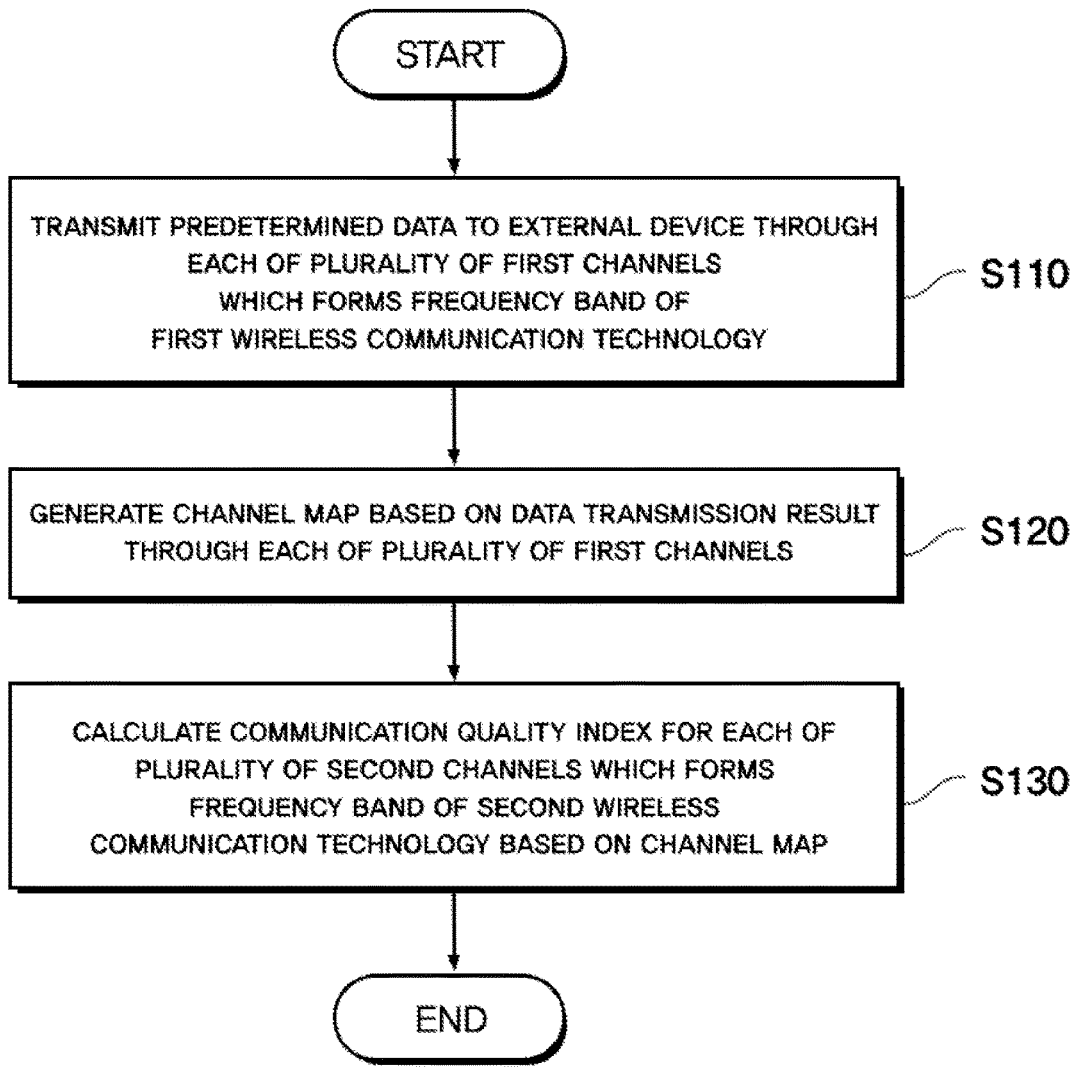

[FIG. 2]
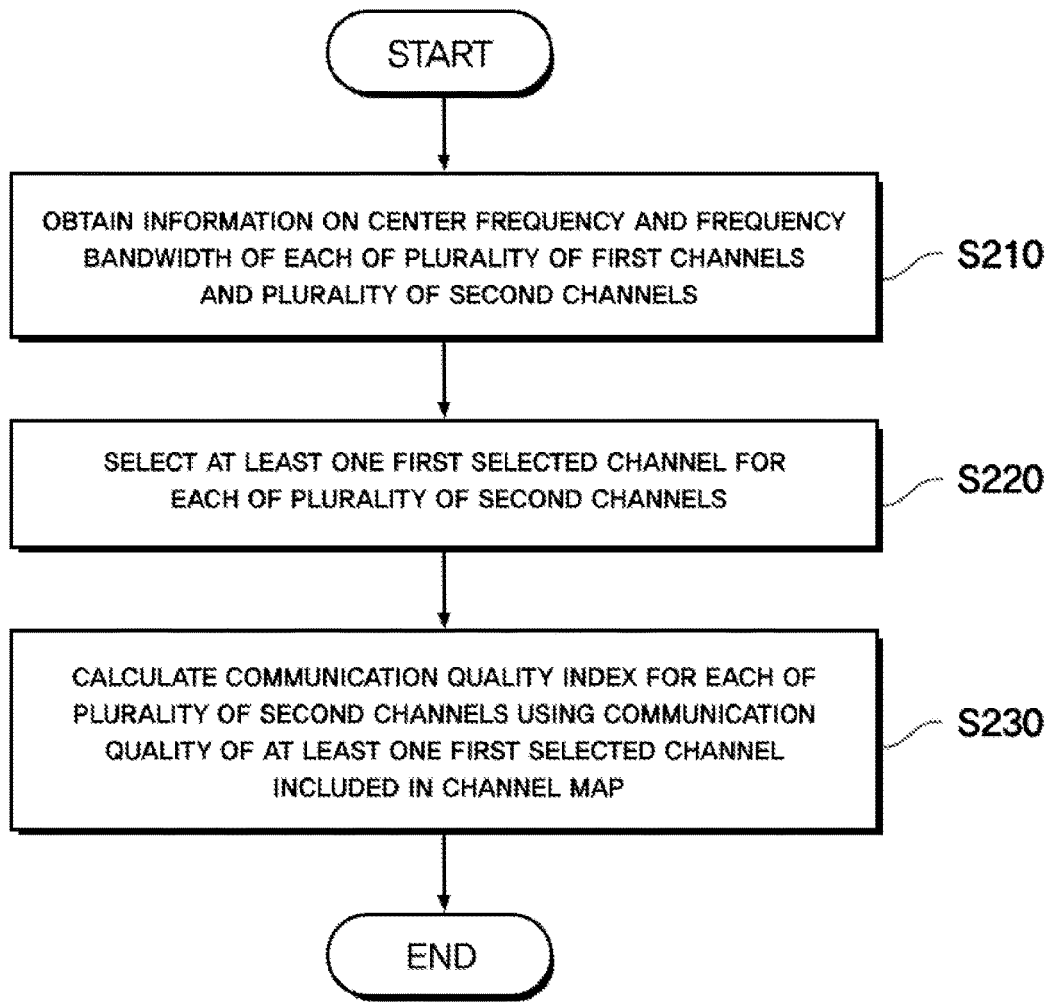

[FIG. 3]
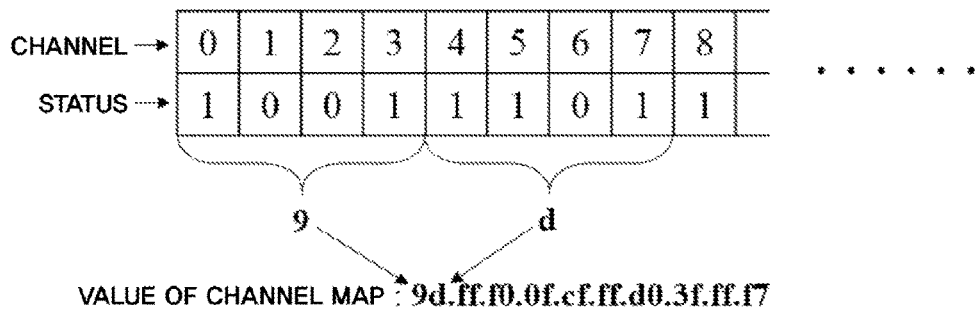
[FIG. 4]
| PSEUDO CODE : CALCULATE CHANNEL QUALITY INDEX |
|---|
| 1: while $i < n_B$ do |
| 2:     while $j < l$ do |
| 3:         $sum[i]\ += cmm_B[i][j]$ |
| 4:     end while |
| 5: end while |
| 6: while $i < n_W$ do |
| 7:     while $j < n_B$ do |
| 8:         if $B_j \subset W_i$ then |
| 9:             $cqiv_W[i]\ += sum[j]$ |
| 10:             $olcn[i]{++}$ |
| 11:         end if |
| 12:     end while |
| 13:     $cqiv_W[i] = 1 - \{cqiv_W[i]\ /\ (olcn[i] * l)\}$ |
| 14: end while |

[FIG. 5]
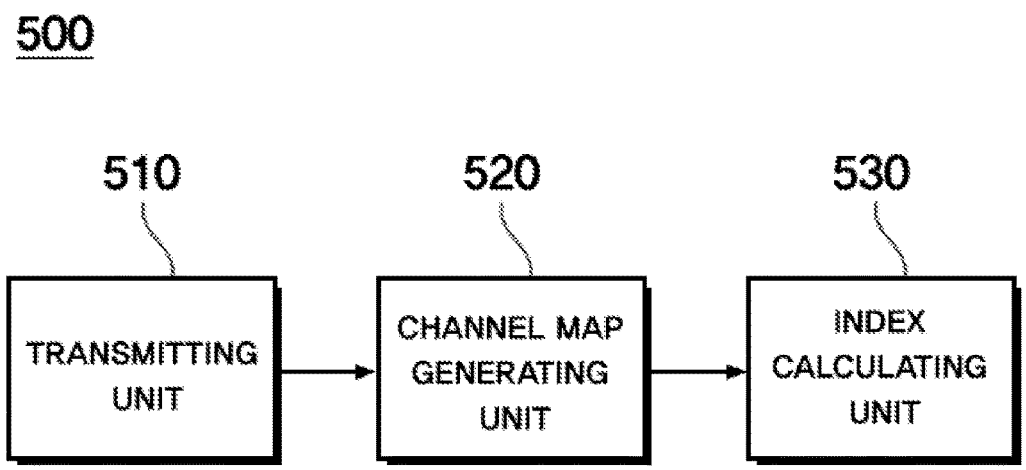

[FIG. 6]
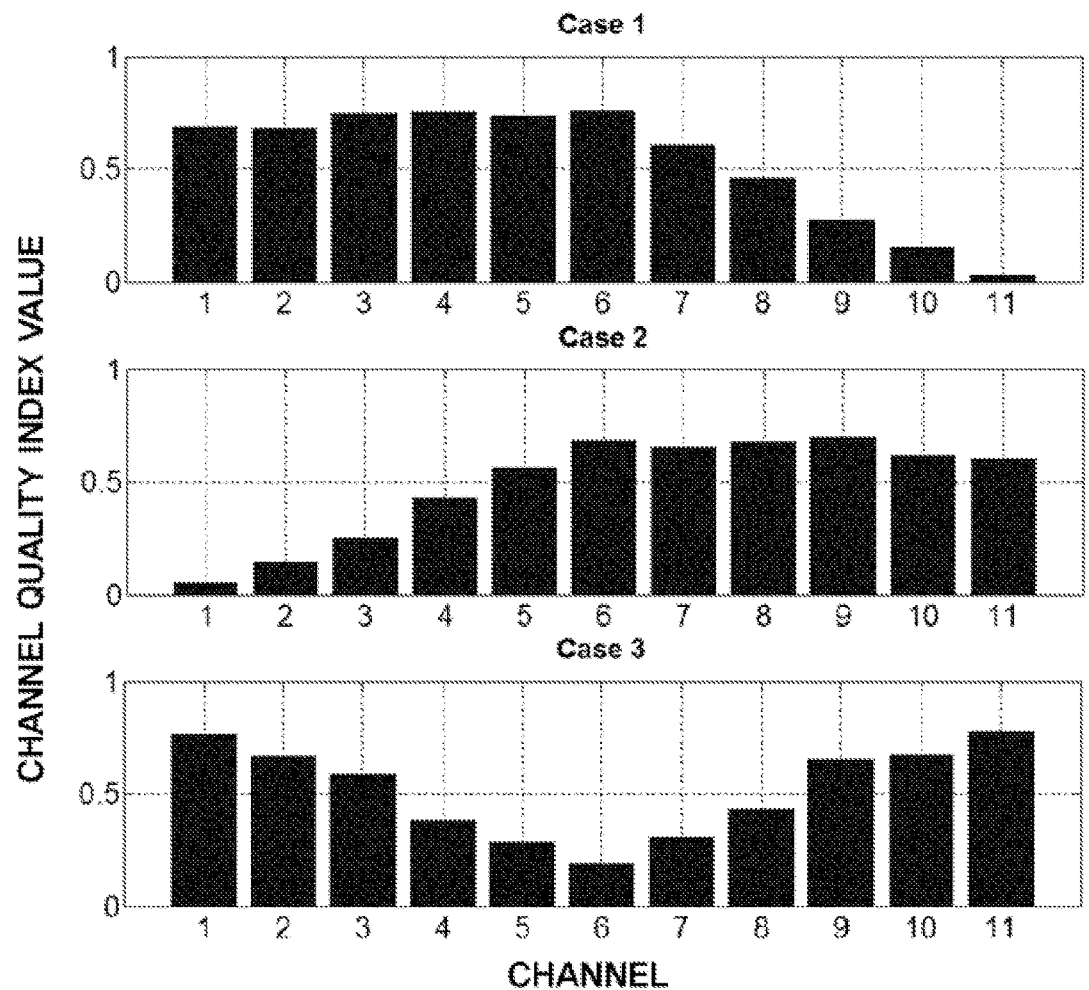

[FIG. 7]
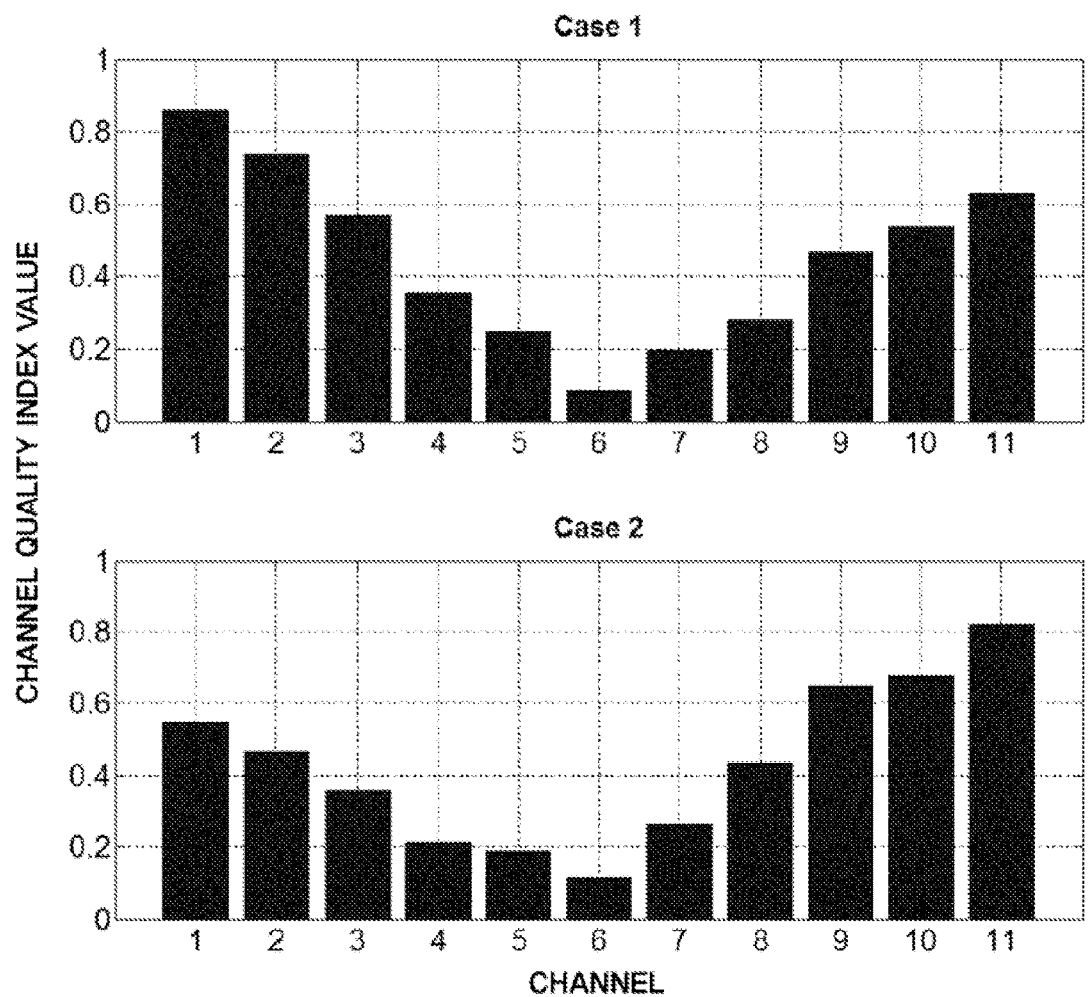

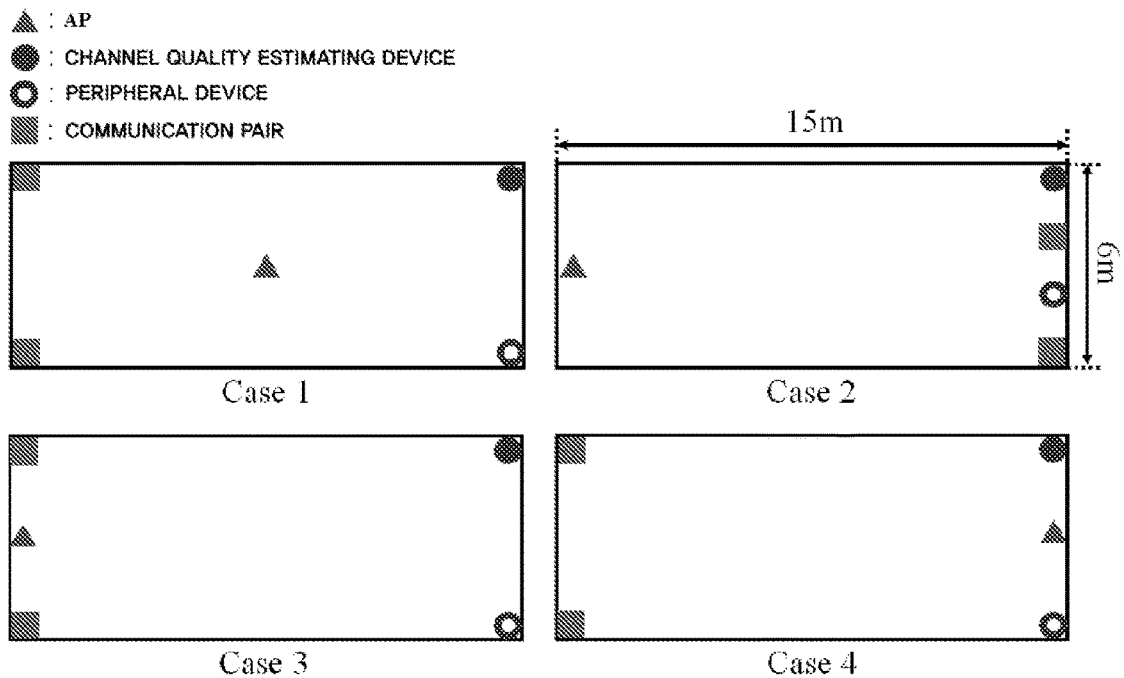
[FIG. 8]

[FIG. 9]
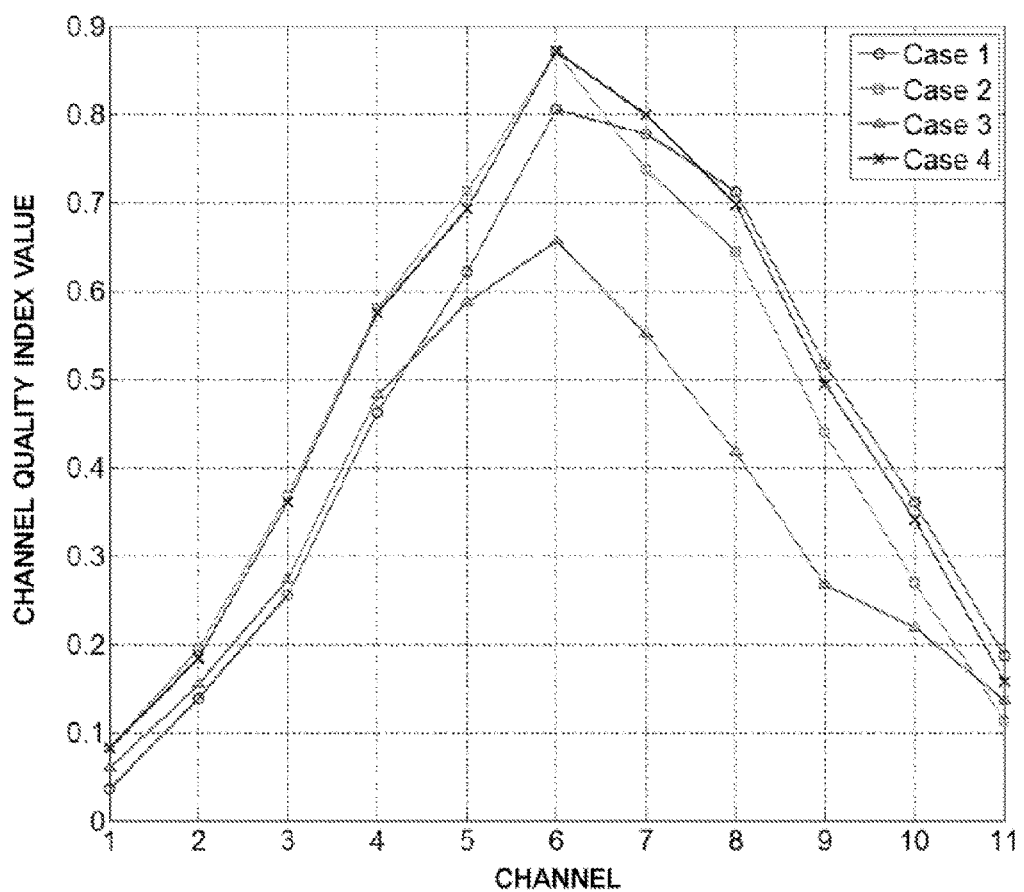

[FIG. 10]
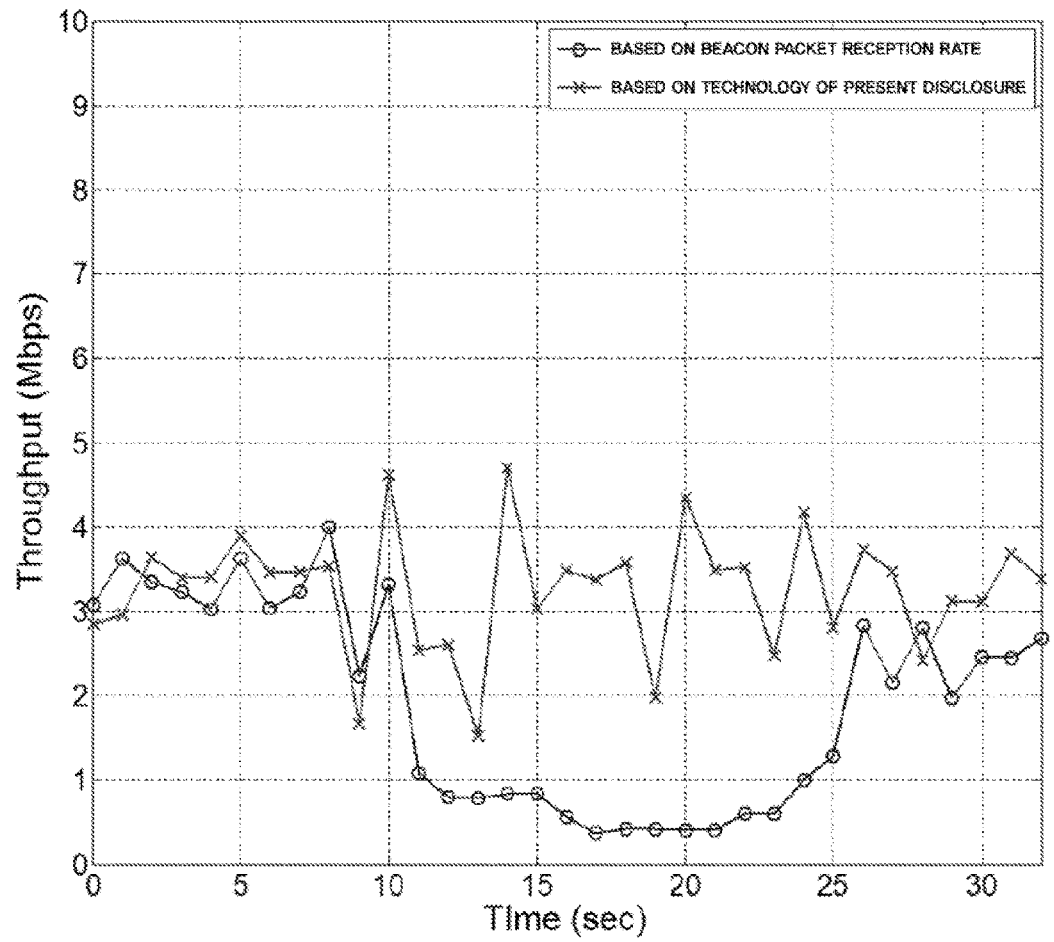
[FIG. 11]
| SLEEP TIME (SECONDS) | 5 | 10 | 30 | 60 |
|---|---|---|---|---|
| INCREASED CURRENT AMOUNT (mA) | 11.27 | 9.40 | 5.26 | 4.10 |
| INCREASING RATE (%) | 3.0 | 2.5 | 1.4 | 1.1 |

[FIG. 12]

|  | WHEN TECHNOLOGY OF PRESENT DISCLOSURE IS USED | WHEN TECHNOLOGY OF PRESENT DISCLOSURE IS NOT USED |
|---|---|---|
| Data rate (Kbps) | 346.3 (2.4 TIMES) | 147.0 |

METHOD AND APPARATUS FOR ESTIMATING CHANNEL COMMUNICATION QUALITY OF WIRELESS COMMUNICATION TECHNOLOGY

CROSS-REFERENCE TO RELATED APPLICATIONS

This application claims the priority of Korean Patent Application No. 10-2016-0041427 filed on Apr. 5, 2016, in the Korean Intellectual Property Office, the disclosure of which is incorporated herein by reference.

BACKGROUND

Field

The present disclosure relates to a method and an apparatus which estimate a channel communication quality of one wireless communication technology using other wireless communication technologies having an overlapping frequency band.

Description of the Related Art

A representative technique which estimates a channel status in a wireless LAN (IEEE 802.11) which is the most representative wireless communication technology using 2.4 GHz ISM (industrial, scientific, and medical) band is to figure out a status of a channel through reception rates of beacon packets. In the wireless LAN, an access point (AP) periodically broadcasts a beacon packet for notifying its own status. In this case, when the channel is busy, conflict and error rate between transmission packets are increased. Therefore, wireless equipment measures a beacon reception rate of each channel by continuously monitoring beacon packets which are periodically received and estimates a status of the channel therethrough.

The Bluetooth is also a representative wireless communication technology which uses a 2.4 GHz ISM band, in addition to the wireless LAN. According to the Bluetooth technology, communication is performed while switching 79 channels at a speed of 1600 hops/s. A Bluetooth device searches for peripheral signal interferences to perform Bluetooth communication through other channels excluding a channel through which the communication is being performed. This is called adaptive frequency hopping (AFH). Therefore, as an effort for implementing a more efficient and accurate AFH algorithm, various AFH technologies have been suggested.

However, in the related art such as the wireless LAN and the Bluetooth, a module which performs the monitoring is the same as a module of a channel which is observed. That is, a monitoring technique using a wireless LAN checks statuses of only wireless LAN channels and a monitoring technique using the Bluetooth checks statuses of only Bluetooth channels. That is, generality is not so wide.

Therefore, necessity for a method and an apparatus which estimate a channel communication quality of one wireless communication technology using other wireless communication technologies on an overlapping frequency band comes to the fore.

The related art is disclosed in Korean Unexamined Patent Application Publication No. 10-2012-0037178 (entitled "access point and channel changing method, published on Apr. 19, 2012).

SUMMARY

The present disclosure has been made in an effort to provide a method and an apparatus which estimate a channel communication quality of one wireless communication technology using other wireless communication technologies on an overlapping frequency band.

Technical problems of the present solution are not limited to the above-mentioned technical problems, and other technical problems, which are not mentioned above, can be clearly understood by those skilled in the art from the following descriptions.

According to an aspect of the present disclosure, there is provided a method for estimating a channel communication quality of a second wireless communication technology whose frequency band entirely or partially overlaps a frequency band of a first wireless communication technology. The method includes: transmitting predetermined data to an external device through each of a plurality of first channels which forms a frequency band of the first wireless communication technology; generating a channel map which represents a communication quality for each of the plurality of first channels based on a data transmission result through each of the plurality of first channels; and calculating a communication quality index for each of a plurality of second channels which forms a frequency band of the second wireless communication technology, based on the channel map.

In the generating of a channel map which represents a communication quality, a communication quality for each of the plurality of first channels may be determined based on at least one of whether to receive response data of the external device corresponding to the transmitted data and a strength of a signal.

The calculating of a communication quality index for each of the plurality of second channels may include: obtaining information on a center frequency and a frequency bandwidth for each of the plurality of first channels and the plurality of second channels; selecting at least one first selected channel which is the first channel having a frequency band which entirely or partially overlaps each of the plurality of second channels; and calculating a communication quality index for each of the plurality of second channels using a communication quality of each of at least one first selected channel included in the channel map.

When the transmitting of data, the generating of a channel map, and the calculating of a communication quality index are periodically repeated, in the generating of a channel map, the channel map may be generated further based on a predetermined number of data transmission results which is performed before transmitting the data.

The repeatedly performed period may be determined based on power consumption in accordance with data transmission, remaining power, and whether to perform data communication using the second wireless communication technology.

The method may further include transmitting good channel information which is information on a second channel having the best calculated communication quality index among the plurality of second channels to a user or a previously registered device.

The method may further include receiving channel frequency information including information on the center frequency and the frequency bandwidth for each of the plurality of second channels from the user.

When data is transmitted or received through the second wireless communication technology which is one of the Bluetooth, the wireless LAN (IEEE 802.11), and ZigBee, one of the Bluetooth, the wireless LAN, and the ZigBee which are not determined as the second wireless communication technology may be determined as the first wireless communication technology.

According to another aspect of the present disclosure, there is provided an apparatus for estimating a channel communication quality of a second wireless communication technology whose frequency band entirely or partially overlaps a frequency band of a first wireless communication technology. The apparatus includes: a transmitting unit which transmits predetermined data to an external device through each of a plurality of first channels which forms a frequency band of the first wireless communication technology; a channel map generating unit which generates a channel map which represents a communication quality for each of the plurality of first channels based on a data transmission result through each of the plurality of first channels; and an index calculating unit which calculates a communication quality index for each of a plurality of second channels which forms a frequency band of the second wireless communication technology, based on the channel map.

The channel map generating unit may determine a communication quality for each of the plurality of first channels based on at least one of whether to receive response data of the external device corresponding to the transmitted data and a strength of a signal.

The index calculating unit may obtain information on a center frequency and a frequency bandwidth for each of the plurality of first channels and the plurality of second channels, select at least one first selected channel which is the first channel having a frequency band which entirely or partially overlaps each of the plurality of second channels; and calculate a communication quality index for each of the plurality of second channels using a communication quality of each of at least one first selected channel included in the channel map.

When the data transmission of the transmitting unit, the channel map generation of the channel map generating unit, and the calculating of a communication quality index of the index calculating unit are periodically repeated, the channel map generating unit may generate the channel map further based on a predetermined number of data transmission results which is performed before transmitting the data.

The repeatedly performed period may be determined based on at least one of power consumption in accordance with data transmission, remaining power, and whether to perform data communication using the second wireless communication technology.

The transmitting unit may further transmit good channel information which is information on a second channel having the best calculated communication quality index among the plurality of second channels to a user or a previously registered device.

The apparatus may further include a receiving unit which receives channel frequency information including information on the center frequency and the frequency bandwidth for each of the plurality of second channels from the user.

According to the present disclosure, it is possible to estimate a channel communication quality of one wireless communication technologies using other wireless communication technology having an overlapping frequency band.

According to the present disclosure, it is further possible to consistently estimate a channel communication quality and perform wireless communication using an optimal communication channel obtained from the estimated result.

BRIEF DESCRIPTION OF DRAWINGS

The above and other aspects, features and other advantages of the present disclosure will be more clearly understood from the following detailed description taken in conjunction with the accompanying drawings.

FIG. 1 is a flowchart illustrating for explaining a channel communication quality estimating method of a wireless communication technology.

FIG. 2 is a flowchart illustrating for explaining a method for calculating a communication quality index for each of a plurality of second channels.

FIG. 3 is a view illustrating for explaining a channel map.

FIG. 4 is a view illustrating for explaining a pseudo code for calculating a communication quality index.

FIG. 5 is a view illustrating for explaining a channel communication quality estimating apparatus of a wireless communication technology.

FIGS. 6 and 7 are views illustrating for explaining a result of estimating a channel communication quality of a wireless LAN during data communication using a wireless LAN.

FIGS. 8 and 9 are views illustrating for explaining a result of estimating a channel communication quality of a wireless LAN during data communication using a wireless LAN.

FIG. 10 is a view illustrating for explaining influence of a quality estimating method on data communication using a wireless LAN.

FIG. 11 is a table illustrating for explaining a low power characteristic of a channel communication quality estimating method using Bluetooth.

FIG. 12 is a table illustrating for explaining an effect of a channel communication quality estimating method.

DETAILED DESCRIPTION

Those skilled in the art may make various modifications to the present invention and the present invention may have various embodiments thereof, and thus specific embodiments will be illustrated in the drawings and described in detail in detailed description. However, this does not limit the present invention within specific exemplary embodiments, and it should be understood that the present invention covers all the modifications, equivalents and replacements within the spirit and technical scope of the present invention. In the description of respective drawings, similar reference numerals designate similar elements.

Terminologies such as first or second may be used to describe various components but the components are not limited by the above terminologies. The above terminologies are used only to discriminate one component from the other component. For example, without departing from the scope of the present invention, a first component may be referred to as a second component, and similarly, a second component may be referred to as a first component. A term of and/or includes combination of a plurality of related elements or any one of the plurality of related elements.

It should be understood that, when it is described that an element is "coupled" or "connected" to another element, the element may be directly coupled or directly connected to the other element or coupled or connected to the other element through a third element. On the contrary, it should be understood that when an element is referred to as being "directly connected to" or "directly coupled to" another element, another element does not intervene therebetween.

Terminologies used in the present application are used only to describe specific exemplary embodiments, and are not intended to limit the present invention. A singular form may include a plural form if there is no clearly opposite meaning in the context. In the present invention, it should be understood that term "include" or "have" indicates that a feature, a number, a step, an operation, a component, a part or the combination thoseof described in the specification is present, but do not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

FIG. 1 is a flowchart illustrating for explaining a channel communication quality estimating method of a wireless communication technology.

In a first wireless communication technology and a second wireless communication technology, frequency bands entirely or partially overlap. For example, the first wireless communication technology and the second wireless communication technology may be selected from a wireless LAN (IEEE 802.11, Wi-Fi), Bluetooth, and ZigBee which use 2.4 GHz ISM (industrial, scientific, and medical) band. Further, the communication quality estimating apparatus may be mounted with the first wireless communication technology therein and selectively mounted with the second wireless communication technology.

In step S110, a communication quality estimating apparatus transmits predetermined data to an external device through a plurality of first channels which forms a frequency band of the first wireless communication technology.

For example, when the first wireless communication technology is the Bluetooth, the communication quality estimating apparatus may transmit predetermined data to an external device with a Bluetooth function through each of 79 channels having a bandwidth of 1 MHz at 2.402 GHz to 2.480 GHz which is a frequency band of the Bluetooth.

In this case, the predetermined data may be data which is appointed with the external device. That is, the communication quality estimating apparatus transmits data (for example, echo request) which requests echo and the external device may transmit data (for example, echo reply) corresponding to the echo as a response for the data.

For example, a communication quality estimating apparatus in which a Linux OS is mounted performs l2ping (layer 2 ping) operation which is provided by BlueZ which is a basic Bluetooth stack. L2ping refers to a ping (echo request) process which is performed in a second layer of OSI seven layers. In this case, when the l2ping operation is performed, the communication quality estimating apparatus may transmit data for requesting echo to the external device and receive the echo, without performing a process for requesting and accepting connection for Bluetooth connection between the communication quality estimating apparatus and the external device.

In step S120, the communication quality estimating apparatus generates a channel map which represents a communication quality for each of the plurality of first channels based on a data transmission result through each of the plurality of first channels.

The data transmission result for each of the plurality of first channels may indicate whether the communication quality estimating apparatus successfully transmits the data.

Further, the data transmission result may be information which may be additionally obtained by the data transmission.

For example, the data transmission result may be information indicating whether the communication quality estimating apparatus receives response data corresponding to the transmitted data. Further, the data transmission result may be information on a strength of a communication signal of the external device which is obtained by the communication quality estimating apparatus during a process of transmitting data to the external device.

The communication quality estimating apparatus may generate a channel map which represents a communication quality for each of the plurality of first channels based on the data transmission result.

For example, referring to FIG. 3, when the first wireless communication technology is the Bluetooth, the communication quality estimating apparatus may determine the communication quality to be 0 or 1 for each of a total of 79 channels of the Bluetooth. In this case, "0" indicates that the communication quality is bad and "1" indicates that the communication quality is good. Further, a value of the channel map which is represented by {10011101 . . . } may be represented by a hexadecimal number such as {9D . . . }. That is, when the binary number is represented by a hexadecimal number, 1001 is 0x09 and 1101 is 0x0D.

In other exemplary scenarios, the communication quality estimating apparatus may determine a communication quality for each of the plurality of first channels, based on at least one of whether to receive response data of the external device corresponding to the transmitted data and the strength of the signal.

For example, it may be determined whether the communication quality estimating apparatus transmits an echo request signal which requests echo and receives an echo reply signal corresponding to the echo request as response data from the external device. Alternately, it may be determined whether the communication quality estimating apparatus receives the response data from a received acknowledgement (ACK) signal or a negative acknowledgement (NACK) signal. Further, it may be further determined whether the communication quality estimating apparatus receives a different type of response data corresponding to the transmitted data.

In this case, the data which is transmitted to the external device by the communication quality estimating apparatus may be repeatedly transmitted several times for more accurate determination. Further, it is determined whether the response data is received based on a rate between a number of transmitting times and a number of times of receiving response data. For example, when the communication quality estimating apparatus transmits data ten times and receives response data nine times or more, it is determined that the response data is received.

Further, the communication quality estimating apparatus may obtain signal strength information which is information on a strength of a communication signal of the external device during a wireless communication process with the external device. In this case, the signal strength information may be a received signal strength indicator (RSSI) value which indicates strength of a wireless signal which is received by the wireless LAN, the Bluetooth, and this like in a wireless communication field.

The communication quality estimating apparatus may determine a communication quality for each of the plurality of first channels, based on at least one of whether to receive response data and the strength of the signal.

Moreover, the communication quality estimating apparatus may determine the communication quality by assigning a weight representing a relation degree with the communication quality to each of whether to receive the response data and the strength of the signal. For example, when it is determined that whether to receive the response data has a higher relation degree with the communication quality than the strength of the signal, the communication quality estimating apparatus may determine the communication quality by assigning a larger weight value to whether to receive the response data than that of the strength of the signal. More specifically, the communication quality estimating apparatus assigns 2 points or 0 point to the communication quality of the first channel depending on whether to receive the response data and separately assigns 0 to 1 point at maximum to the communication quality of the first channel depending on the strength of the signal. In this case, the communication quality of the first channel may have a value of at least 0 point to at most 3 points.

Finally, in step S130, the communication quality estimating apparatus calculates a communication quality index for each of a plurality of second channels which forms a frequency band of the second wireless communication technology, based on the generated channel map.

The communication quality estimating apparatus may select at least one of first channels corresponding to each of the plurality of second channels which forms the frequency band of the second wireless communication technology. The selection is allowed because the frequency bands of the first wireless communication technology and the second wireless communication technology entirely or partially overlap. Further, the communication quality estimating apparatus may calculate a communication quality index for each of the plurality of second channels using a communication quality of at least one selected first channel which is included in the generated channel map.

In this case, depending on a calculating method, the communication quality index is determined such that the higher the index value is (for example, converged to at most 100), the better the communication quality is. To the contrary, it may be determined that the smaller the index value is (for example, converged to at least 0), the better the communication quality is.

In the meantime, a method for calculating a communication quality index will be described in more detail with reference to FIGS. 2 and 4.

In another exemplary scenarios, the communication quality estimating apparatus may calculate a communication quality index for each of the plurality of second channels using a pseudo code illustrated in FIG. 4.

Referring to FIG. 4, $n_B$ is a total number of first channels, l is a total number of communication quality result values stored for every first channel, $cmm_B[i][j]$ is a communication quality result value which is calculated for an i-th first channel for a j-th time (in this case, j<l). sum[i] is a sum of l communication quality result values for the i-th first channel. Further, $n_W$ is a total number of second channels, $cqiv_W[i]$ is a communication quality index for an i-th second channel, and olcn[i] is a total number of selected first channels corresponding to the i-th second channel.

More specifically, first to fifth rows of the pseudo code calculates a sum (sum[i]) of the communication quality result values for each of the plurality of first channels. In this case, when it is assumed that the communication quality result value is 0 (bad) or 1 (good), the calculated sum (sum[i]) of the communication quality result values may have a value of 0 to l.

Further, sixth to fourteenth rows of the pseudo code select at least one of first channels corresponding to each of the second channels to finally calculate a communication quality index for each of the second channels. An eighth row selects at least one first channel (that is, the first selected channel) having a frequency band which overlaps a frequency band of the second channel. A ninth row adds all sums (sum[j]) of the communication quality result values corresponding to the first selected channel to calculate a communication quality index ($cqiv_W[i]$) for each of the second channels. A tenth row calculates the number (olcn[i]) of first selected channels for each of the second channels. Finally, a thirteenth row recalculates the communication quality index for each of the second channels to have a value between 0 and 1. In this case, when the communication quality index is close to 0, it is determined that the communication quality of the second channel is good. To the contrary, when the communication quality index is close to 1, it is determined that the communication quality of the second channel is bad.

In another exemplary scenarios, when steps S110 to S130 are periodically repeated, the communication quality estimating apparatus may generate a channel map further based on a predetermined number of data transmission results which are performed before transmitting the data.

For example, since a wireless communication environment may be temporally or momentarily changed due to an external factor, when the communication quality estimating apparatus uses just one data transmission result, inaccurate channel map may be generated. Therefore, the communication quality estimating apparatus may generate a channel map further based on a predetermined number of data transmission results which are performed before finally transmitting data.

More specifically, when the communication quality estimating apparatus repeatedly calculates the communication quality index of each of the plurality of second channels at every minute, the communication quality estimating apparatus may generate a channel map to include latest five data transmission results including a final data transmission result. In this case, the channel map may further have a plurality of communication quality result values corresponding to a past data transmission result for each of the first channels. As a result, the channel map may have a channel map matrix.

In another exemplary scenarios, a period when steps S110 to S130 are repeated may be determined based on at least one of power consumption in accordance with data transmission of the communication quality estimating apparatus, remaining power, and whether to perform data communication using the second wireless communication technology.

For example, when the communication quality estimating apparatus is mounted in mobile equipment, in order to secure a sufficient usage time, a remaining battery amount of the mobile equipment and a consumed battery amount in accordance with repeated data transmission need to be considered. Therefore, the period when steps S110 to S130 are repeated may be determined in consideration of the remaining power of the mobile equipment and power consumption in accordance with the data transmission.

More specifically, when the first wireless communication technology is the Bluetooth, the period may be shorter because the Bluetooth is a communication technology which consumes relatively less power. However, when the first wireless communication technology is the wireless LAN, the period may be increased because the wireless LAN is a communication technology which consumes relatively more power. Further, when the remaining power of the mobile equipment is high, the period may be reduced. When the remaining power is low, the period may be increased to save the battery.

Further, the period when steps S110 to S130 are repeated may be determined depending on whether the mobile equipment performs the data communication using the second wireless communication technology.

More specifically, when the mobile equipment is performing the data communication using the second wireless communication technology, a necessity of estimating a channel communication quality of the second wireless communication technology may be high in order to improve a speed of the data communication. However, when the data communication using the second wireless communication technology is not performed, a necessity of estimating the communication quality may be low.

In still another exemplary scenarios, the communication quality estimating apparatus may transmit excellent channel information which is information on a second channel which has an excellent calculated communication quality index among the plurality of second channels to a user or a previously registered device.

For example, the communication quality estimating apparatus may determine one of second channels (for example, a channel 5) having the best communication quality index among a total of 13 second channels of the second wireless communication technology which is the wireless LAN as a good channel to generate good channel information. Further, the communication quality estimating apparatus may transmit the generated good channel information to the user or a previously registered device.

When the user receives the transmitted good channel information, the user may set a wireless LAN device to use channel 5 which is the best second channel when using the wireless LAN. Further, the previously registered device (for example, AP) may be mounted with the wireless LAN and perform data communication with other peripheral devices using channel 5 of the wireless LAN.

In still another exemplary scenarios, the communication quality estimating apparatus may receive channel frequency information including information on a center frequency and a frequency band for each of the plurality of second channels from the user.

For example, when the user wants to estimate a channel quality for a new communication technology (that is, the second wireless communication technology) at a 2.4 GHz ISM band, the communication quality estimating device may receive the information on the center frequency and the frequency band for each of the plurality of second channels which forms a frequency band of the new communication technology in the form of channel frequency information from the user. The communication quality estimating apparatus may calculate a communication quality index for each of the plurality of second channels using the transmitted channel frequency information.

In another exemplary scenarios, when the communication quality estimating apparatus transmits or receives data through the second wireless communication technology which is one of the Bluetooth, the wireless LAN (IEEE 802.11), and ZigBee, one of the Bluetooth, the wireless LAN, and the ZigBee which are not determined as the second wireless communication technology may be determined as the first wireless communication technology.

That is, when the communication quality estimating apparatus uses the mounted second wireless communication technology which is one of the Bluetooth, the wireless LAN, and the ZigBee, one of the remaining technologies which are not determined as the second wireless communication technology may be determined as the first wireless communication technology.

This is because when the communication quality estimating apparatus is using the second wireless communication technology and the first wireless communication technology is equal to the second wireless communication technology, it is difficult to smoothly calculate the communication quality index for each of the plurality of second channels using the first wireless communication technology. For example, it is not possible for the communication quality estimating apparatus to estimate the channel quality of the wireless LAN using the wireless LAN while downloading data through the wireless LAN unless the communication quality estimating apparatus stops downloading the data. Therefore, in this case, not the wireless LAN, but one of the Bluetooth and the ZigBee may be determined as the first wireless communication technology.

Referring to FIGS. 6 and 7, when the data communication using the wireless LAN is performed, a result of estimating the quality of the second channel using the Bluetooth as the first wireless communication technology and the wireless LAN as the second wireless communication technology and calculating the communication quality index, by the communication quality estimating apparatus may be checked.

In this case, it is assumed that the index of the communication quality is calculated through an algorithm of FIG. 4. That is, the calculated communication quality index has a value between 0 and 1. As the communication quality index is close to 0, the communication quality is considered to be good and as the communication quality index is close to 1, the communication quality is considered to be bad.

First, referring to FIG. 6, Case 1 is a result of estimating the quality of the second channel and calculating the communication quality index (which is the same as the channel quality index) by the communication quality estimating apparatus while the data communication is performed through channel 1 and channel 6 of the wireless LAN. It is confirmed that the communication quality index is 0.5 or higher at channel 1, channel 6, and adjacent channels thereto and the communication quality index has a value which is close to 0 at channel 11 which is relatively distant.

In Case 2, the data communication is performed through channel 6 and channel 11 of the wireless LAN and in Case 3, the data communication is performed through channel 1 and channel 11 of the wireless LAN. In both Case 2 and Case 3, similarly to Case 1, it is confirmed that the communication quality index at channels through which the data communication is performed and adjacent channels thereto is 0.5 or higher.

Further, referring to FIG. 7, in Case 1, the data communication is performed through channel 1 and channel 11 and more data is transmitted through channel 1 between two channels. It is confirmed that the communication quality index of channel 1 is 0.8 or higher and the communication quality index of channel 11 is 0.6 or higher. In Case 2, more data is transmitted through channel 11. It is confirmed that the communication quality index of channel 1 is 0.5 or higher and the communication quality index of channel 11 is 0.8 or higher.

Therefore, it is confirmed that the communication quality estimating apparatus accurately calculates the communication quality index of each second channel to be complied with a current usage situation of the second wireless communication technology (wireless LAN).

Referring to FIGS. 8 and 9, when data communication using the wireless LAN between one communication pair (a quadrangle) is performed through channel 6, a result of calculating a communication quality index of the second channel by the communication quality estimating apparatus (a solid circle) using the Bluetooth as the first wireless communication technology and the wireless LAN as the second wireless communication technology is confirmed.

It is confirmed that regardless of the arrangement of the equipment in Cases 1 to 4 in FIG. 8, the communication quality index of Cases 1 to 4 of FIG. 9 shows an almost similar tendency.

As a result, it is confirmed that regardless of the arrangement of the equipment, the communication quality estimating apparatus accurately calculates the communication quality index of each second channel to be complied with a current usage situation of the second wireless communication technology.

Referring to FIG. 10, influences on a throughput of the data communication which is already being performed are confirmed in each of case 1 in which the communication quality estimating method of the present disclosure using the Bluetooth as the first wireless communication technology is used and case 2 in which a quality estimating method through a reception rate of a beacon packet which is transmitted from a wireless LAN based access point (AP) of the related art is used, while performing data communication using the wireless LAN.

That is, it is confirmed that when the Bluetooth based communication quality estimating apparatus of the present disclosure is used, the channel communication quality index may be calculated without having an influence on a throughput of the data communication. However, it is confirmed that when a wireless LAN based quality estimating method through a beacon packet reception rate is used, the throughput of the data communication which is already performed is significantly influenced.

Referring to FIG. 11, it is confirmed that when the communication quality estimating method using the Bluetooth as the first wireless communication technology of the present disclosure is used, even though the communication quality estimating method is consistently performed at an interval of 30 seconds or 60 seconds, an increasing rate of power consumption is 1.4% or 1.1%.

That is, even in the wireless equipment in which power consumption is the important issue, the communication quality estimating method using the Bluetooth as the first wireless communication technology of the present disclosure is used to consistently calculate and monitor the communication quality index.

Referring to FIG. 12, it is confirmed that when the communication quality estimating apparatus consistently calculates a communication quality index for every second channel and the calculated communication quality index provides good channel information for the best second channel, an average data transmission rate of the second wireless communication technology through the second channel is approximately 2.4 times increased from 147 Kbps of the related art to 346.3 Kbps.

In this case, as described above, the communication quality index is calculated not only by the strength of the signal but also collectively considering whether the communication quality estimating apparatus receives the response data.

For example, when the second wireless communication technology is the wireless LAN, a communication channel which is set in an AP which is closely located is not simply selected as an optimal second channel, but a communication channel which is set in a distant AP may be selected as an optimal second channel by collectively considering whether to receive the response data.

As described above, a channel communication quality estimating method of a wireless communication technology may estimate a channel communication quality of one wireless communication technology using other wireless communication technologies having an overlapping frequency band.

FIG. 2 is a flowchart illustrating for explaining a method for calculating a communication quality index for each of a plurality of second channels.

In step S210, the communication quality estimating apparatus obtains information on a center frequency and a frequency band width for each of the plurality of first channels and the plurality of second channels.

For example, the communication quality estimating apparatus may receive information on the center frequency and the frequency bandwidth of the plurality of first channels and the plurality of second channels from a DB including information on the center frequency and the frequency bandwidth for each channel for every type of wireless communication technologies. In this case, the DB may be located at anywhere inside or outside the communication quality estimating apparatus.

In step S220, the communication quality estimating apparatus selects at least one first selected channel which is the first channel having a frequency band which entirely or partially overlaps the plurality of second channels.

That is, the communication quality estimating apparatus selects at least one first selected channel which entirely or partially overlaps the plurality of second channels. In this case, the first selected channel refers to at least one channel of the plurality of first channels whose frequency band overlaps the frequency band of the second channel.

For example, when the first channel is formed by a total of 79 channels having a bandwidth of 1 MHz from 2.402 GHz to 2.408 GHz, if one of the plurality of second channels has a center frequency of 2.412 GHz and a bandwidth of 22 MHz, the first selected channels corresponding to the second channel may be a total of 22 from 2.401 GHz to 2.422 GHz.

However, the plurality of first selected channels is not always provided for each of the second channels. In other words, only one selected channel is provided for one second channel or only one same first selected channel may be provided for each of the plurality of second channels.

Finally, in step S230, the communication quality estimating apparatus calculates a communication quality index for each of the plurality of second channels using a communication quality of at least one first selected channel included in the channel map.

For example, when the communication quality of the first channel included in the channel map is 0 (bad) or 1 (good), the communication quality estimating apparatus may calculate the communication quality index by adding values of the communication quality of at least one corresponding first selected channel. In this case, the value of the communication quality is included in the channel map. The large the value of the calculated communication quality index is, the better the communication quality is.

FIG. 5 is a view illustrating for explaining a channel communication quality estimating apparatus of a wireless communication technology.

Referring to FIG. 5, a channel communication quality estimating apparatus 500 of a wireless communication technology includes a transmitting unit 510, a channel map generating unit 520, and an index calculating unit 530.

Further, the channel communication quality estimating apparatus may selectively include a receiving unit (not illustrated).

In the meantime, the channel communication quality estimating apparatus 500 of the wireless communication technology may be mounted in a desktop PC, a notebook, a smart phone, or a tablet PC, and the like.

The transmitting unit 510 transmits predetermined data to an external device through each of the plurality of first channels which forms a frequency band of a first wireless communication technology.

The channel map generating unit 520 generates a channel map which represents a communication quality for each of the plurality of first channels based on a data transmission result through each of the plurality of first channels.

In another exemplary scenarios, the channel map generating unit 520 may determine a communication quality for each of the plurality of first channels, based on at least one of whether to receive response data of the external device corresponding to the transmitted data and the strength of the signal.

The index calculating unit 530 calculates a communication quality index for each of the plurality of second channels which forms a frequency band of a second wireless communication technology, based on the generated channel map.

In another exemplary scenarios, the index calculating unit 530 obtains on a center frequency and a frequency bandwidth for each of the plurality of first channels and the plurality of second channels, selects at least one first selected channel which is a first channel having a frequency band which entirely or partially overlaps with respect to the plurality of second channels, and calculates the communication quality index for each of the plurality of second channels using a communication quality of at least one first selected channel included in the channel map.

The receiving unit (not illustrated) receives channel frequency information including information on the center frequency and the frequency band for each of the plurality of second channels from the user.

In another exemplary scenarios, when data transmission of the transmitting unit 510, generation of a channel map of the channel map generating unit 520, and calculation of a communication quality index of the index calculating unit 530 are periodically repeated, the channel map generating unit 520 may generate a channel map further based on the predetermined number of data transmission results which is performed before transmitting data.

In another exemplary scenarios, the repeatedly performed period may be determined based on at least one of power consumption in accordance with data transmission, remaining power, and whether to perform data communication using the second wireless communication technology.

In still another exemplary scenarios, the transmitting unit 510 may further transmit excellent channel information which is information on a second channel which has an excellent calculated communication quality index among the plurality of second channels to a user or a previously registered device.

In the meantime, the above-described exemplary embodiments of the present disclosure may be created by a computer executable program and implemented in a general use digital computer which operates the program using a computer readable medium.

The computer readable recording medium includes a magnetic storage medium (for example, a ROM, a floppy disk, a hard disk, and the like) and an optical reading medium (for example, CD-ROM, a DVD, and the like).

For now, the present invention has been described with reference to the exemplary embodiments. It is understood to those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

What is claimed is:

1. A method for estimating a channel communication quality of a second wireless communication technology whose frequency band entirely or partially overlaps a frequency band of a first wireless communication technology, the method comprising:
   transmitting predetermined data to an external device through each of a plurality of first channels which forms a frequency band of the first wireless communication technology;
   generating a channel map which represents a communication quality for each of the plurality of first channels based on a data transmission result through each of the plurality of first channels;
   calculating a communication quality index for each of a plurality of second channels which forms a frequency band of the second wireless communication technology, based on the channel map; and
   transmitting good channel information which is information on a second channel having the best calculated communication quality index among the plurality of second channels to a user or a previously registered device;
   wherein the channel map is generated further based on a predetermined number of data transmission results which is performed before transmitting the data; and
   wherein the calculating of a communication quality index for each of the plurality of second channels includes
      obtaining information on a center frequency and a frequency bandwidth for each of the plurality of first channels and the plurality of second channels,
      selecting at least one first selected channel which is the first channel having a frequency band which entirely or partially overlaps each of the plurality of second channels, and
      calculating the communication quality index for each of the plurality of second channels using the communication quality of each of at least one first selected channel included in the channel map.

2. The method according to claim 1, wherein in the generating of a channel map which represents a communication quality, a communication quality for each of the plurality of first channels is determined based on at least one of whether to receive response data of the external device corresponding to the transmitted data and a strength of a signal.

3. The method according to claim 1, wherein the transmitting of data, the generating of a channel map, and the calculating of a communication quality index are periodically repeated.

4. The method according to claim 3, wherein the repeatedly performed period is determined based on at least one of power consumption in accordance with data transmission of an apparatus which performs a channel communication quality estimating method of a wireless communication technology, remaining power, and whether to perform data communication using the second wireless communication technology.

5. The method according to claim 1, further comprising receiving channel frequency information including information on the center frequency and the frequency bandwidth for each of the plurality of second channels from the user.

6. The method according to claim 1, wherein when data is transmitted or received through the second wireless communication technology which is one of the Bluetooth, the wireless Local Area Network (LAN) (IEEE 802.11), and ZigBee, one of the Bluetooth, the wireless LAN, and the ZigBee which are not determined as the second wireless communication technology is determined as the first wireless communication technology.

7. An apparatus for estimating a channel communication quality of a second wireless communication technology whose frequency band entirely or partially overlaps a frequency band of a first wireless communication technology, the apparatus comprising:
   a computer processor;
   a data storage device; and
   a computer readable code stored in the data storage device and executable by the computer processor, the computer readable code defining functional units which include:
      a transmitting unit which transmits predetermined data to an external device through each of a plurality of first channels which forms a frequency band of the first wireless communication technology;
      a channel map generating unit which generates a channel map which represents a communication quality for each of the plurality of first channels based on a data transmission result through each of the plurality of first channels; and
      an index calculating unit which calculates a communication quality index for each of a plurality of second channels which forms a frequency band of the second wireless communication technology based on the channel map;
   wherein the transmitting unit further transmits good channel information which is information on a second channel having the best calculated communication quality index among the plurality of second channels to a user or a previously registered device, the channel map generating unit generates the channel map further based on a predetermined number of data transmission results which is performed before transmitting the data; and
   wherein the communication quality index for each of the plurality of second channels is computed by
      obtaining information on a center frequency and a frequency bandwidth for each of the plurality of first channels and the plurality of second channels,
      selecting at least one first selected channel which is the first channel having a frequency band which entirely or partially overlaps each of the plurality of second channels, and
      calculating the communication quality index for each of the plurality of second channels using the communication quality of each of at least one first selected channel included in the channel map.

8. The apparatus according to claim 7, wherein the channel map generating unit determines a communication quality for each of the plurality of first channels based on at least one of whether to receive response data of the external device corresponding to the transmitted data and a strength of a signal.

9. The apparatus according to claim 7, wherein the index calculating unit obtains information on a center frequency and a frequency bandwidth for each of the plurality of first channels and the plurality of second channels, selects at least one first selected channel which is the first channel having a frequency band which entirely or partially overlaps each of the plurality of second channels; and calculates a communication quality index for each of the plurality of second channels using a communication quality for each of at least one first selected channel included in the channel map.

10. The apparatus according to claim 7, wherein the data transmission of the transmitting unit, the channel map generation of the channel map generating unit, and the calculating of a communication quality index of the index calculating unit are periodically repeated.

11. The apparatus according to claim 10, wherein the repeatedly performed period is determined based on at least one of power consumption in accordance with data transmission, remaining power, and whether to perform data communication using the second wireless communication technology.

12. The apparatus according to claim 7, wherein the functional units further include a receiving unit which receives channel frequency information including information on a center frequency and a frequency bandwidth for each of the plurality of second channels from the user.

* * * * *